(12) United States Patent
Otsuki et al.

(10) Patent No.: US 10,257,720 B2
(45) Date of Patent: Apr. 9, 2019

(54) ACCESS POINT PLACEMENT OPTIMIZATION DEVICE AND ACCESS POINT PLACEMENT OPTIMIZATION METHOD

(71) Applicant: Kabushiki Kaisha Toshiba, Tokyo (JP)

(72) Inventors: Tomoshi Otsuki, Kanagawa (JP); Hideyuki Aisu, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 19 days.

(21) Appl. No.: 15/420,616

(22) Filed: Jan. 31, 2017

(65) Prior Publication Data

US 2017/0142601 A1 May 18, 2017

Related U.S. Application Data

(63) Continuation of application No. PCT/JP2016/052980, filed on Feb. 2, 2016.

(30) Foreign Application Priority Data

Feb. 3, 2015 (JP) .................................. 2015-019586

(51) Int. Cl.
*H04W 24/02* (2009.01)
*H04W 16/18* (2009.01)
(Continued)

(52) U.S. Cl.
CPC ............. *H04W 24/02* (2013.01); *H04W 4/04* (2013.01); *H04W 16/18* (2013.01); *H04W 84/18* (2013.01)

(58) Field of Classification Search
None
See application file for complete search history.

(56) References Cited

U.S. PATENT DOCUMENTS 6,952,396 B1 * 10/2005 Cottreau ............. H04L 12/2852
370/222
7,486,322 B2 2/2009 Shinotsuka et al.
(Continued)

FOREIGN PATENT DOCUMENTS

JP 2004-23726 1/2004
JP 2006-81077 3/2006
(Continued)

OTHER PUBLICATIONS

International Search Report dated Apr. 26, 2016, issued by the Japanese Patent Office in counterpart International Application No. PCT/JP2016/052980; 2 pages.

*Primary Examiner* — Eunsook Choi
(74) *Attorney, Agent, or Firm* — Finnegan, Henderson, Farabow, Garrett & Dunner, L.L.P.

(57) ABSTRACT

An access point placement optimization device includes processing circuitry configured to: determine possibilities of communication between respective pairs of nodes in a wireless multi-hop network including a plurality of wireless terminals and a plurality of access points as the nodes; calculate, on basis of the possibilities of communication, a covering range of the wireless terminals with which each of the access points is allowed to make communications within a predetermined number of hops; generate one or more combinations of the access points; calculate, on basis of the covering range, a cost and a redundancy in case of placing the access points in accordance with each of the one or more combinations; and select the combination from the one or more combinations on basis of the redundancy and the cost.

11 Claims, 10 Drawing Sheets

(51) Int. Cl.
*H04W 4/04* (2009.01)
*H04W 84/18* (2009.01)

(56) References Cited

U.S. PATENT DOCUMENTS

| | | | |
|---|---|---|---|
| 7,552,034 B2 | 6/2009 | Ebata et al. | |
| 2009/0285124 A1* | 11/2009 | Aguirre | H04L 45/122 370/255 |
| 2010/0091745 A1 | 4/2010 | Bevan et al. | |
| 2011/0050457 A1 | 3/2011 | Billhartz et al. | |
| 2014/0036691 A1* | 2/2014 | Madan | H04W 24/10 370/242 |
| 2015/0280931 A1* | 10/2015 | Hori | H04W 4/06 370/312 |
| 2017/0188266 A1* | 6/2017 | Tian | H04W 28/08 |

FOREIGN PATENT DOCUMENTS

| | | |
|---|---|---|
| JP | 2007-235831 | 9/2007 |
| JP | 2009-218913 | 9/2009 |
| JP | 2010-141805 | 6/2010 |
| JP | 2010-206314 | 9/2010 |
| JP | 2012-505581 | 3/2012 |
| JP | 2012-209723 | 10/2012 |
| JP | 2013-503589 | 1/2013 |

* cited by examiner

| WIRELESS TERMINAL | a | b | c | ... |
|---|---|---|---|---|
| x-COORDINATE | 10 | 50 | 80 | ... |
| y-COORDINATE | 100 | 80 | 20 | ... |

| CANDIDATE AP | 1 | 2 | 3 | 4 |
|---|---|---|---|---|
| ALLOWABLE HOPS K | 2 | 2 | 2 | 2 |
| x-COORDINATE | 25 | 75 | 25 | 75 |
| y-COORDINATE | 25 | 75 | 75 | 75 |

| CANDIDATE AP | 1 | 2 | 3 | 4 |
|---|---|---|---|---|
| a | ○ | × | ○ | ○ |
| b | ○ | ○ | ○ | × |
| c | ○ | × | × | × |
| d | ... | ... | ... | ... |

| CANDIDATE AP | 1 | 2 | 3 | 4 |
|---|---|---|---|---|
| COMBINATION 1 | ○ | × | ○ | × |
| COMBINATION 2 | × | ○ | × | ○ |
| COMBINATION 3 | ○ | ○ | × | × |
| ... | ... | ... | ... | ... |

FIG. 7

| CANDIDATE AP | 1 | 2 | 3 | 4 |
|---|---|---|---|---|
| AP PLACEMENT COST | 10000 | 10000 | 10000 | 10000 |
| AP COMMUNICATION COST | 2000 | 2000 | 2000 | 2000 |

| WIRELESS TERMINAL | a | b | c | ... |
|---|---|---|---|---|
| ISOLATION COST | 2000 | 2000 | 2000 | ... |
| NON-REDUNDANCY COST | 1000 | 1000 | 1000 | ... |

FIG. 8

| MINIMUM AP MULTIPLICITY | 2 |
|---|---|
| MINIMUM WIRELESS TERMINAL MULTIPLICITY | 2 |

FIG. 9

| CANDIDATE AP | 1 | 2 | 3 | 4 |
|---|---|---|---|---|
| a | 0.8 | 0.05 | 0.4 | 0.6 |
| b | 0.8 | 0.6 | 0.7 | 0.02 |
| c | 0.6 | 0.05 | 0.03 | 0.01 |
| d | ... | ... | ... | ... |

US 10,257,720 B2

ACCESS POINT PLACEMENT OPTIMIZATION DEVICE AND ACCESS POINT PLACEMENT OPTIMIZATION METHOD

CROSS REFERENCE TO RELATED APPLICATIONS

This application is a Continuation of International Application No. PCT/JP2016/052980, filed on Feb. 2, 2016, the entire contents of which is hereby incorporated by reference.

FIELD

Embodiments of the present invention relate to an access point placement optimization device and an access point placement optimization method.

BACKGROUND

Wireless multi-hop networks have been widely used in recent years to gather information from numerous wireless terminals which are placed in a wide area. A "wireless multi-hop network" in this context refers to a wireless communication network configured by an access point (which may also be called a "concentrator" or "base station") and a plurality of wireless terminals.

Information of the respective wireless terminals in the wireless multi-hop network is transmitted directly or via another wireless terminal or terminals (through hops) to the access point (hereinafter referred to as "AP"). The AP then transmits the information gathered from the respective wireless terminals to a center (e.g., a management server of the wireless multi-hop network). As a result, costs incurred by gathering information from multiple wireless terminals are confined mainly to communication costs of communications between the AP and the center, which enables relatively cost-effective information gathering.

When the wireless terminals in the wireless multi-hop network of this kind are placed in a wide area, multiple APs need to be placed to gather information from all of the wireless terminals. When multiple APs are to be placed, the network is allowed to have redundancy by placing more APs, so that reliability in the communications is improved. However, this entails the drawback that a larger number of APs to be placed leads to higher placement costs to place the APs and higher communication costs. Hence, optimization of the placements of the multiple APs is critical to configuring a low-cost wireless multi-hop network while maintaining the reliability of the communications.

BRIEF DESCRIPTION OF THE DRAWINGS

FIG. 7 is a diagram illustrating an exemplary result of generation of combinations;

FIG. 8 is a diagram illustrating exemplary cost information;

FIG. 9 is a diagram illustrating exemplary redundancy conditions;

DETAILED DESCRIPTION

According to one embodiment, an access point placement optimization device includes processing circuitry configured to: determine possibilities of communication between respective pairs of nodes in a wireless multi-hop network including a plurality of wireless terminals and a plurality of access points as the nodes; calculate, on basis of the possibilities of communication, a covering range of the wireless terminals with which each of the access points is allowed to make communications within a predetermined number of hops; generate one or more combinations of the access points; calculate, on basis of the covering range, a cost and a redundancy in case of placing the access points in accordance with each of the one or more combinations; and select the combination from the one or more combinations on basis of the redundancy and the cost.

Embodiments of the present inventions are described below with reference to the drawings.

(Access Point Placement Optimization Device)

An access point placement optimization device in accordance with one embodiment is described with reference to FIGS. 1 to 11. The access point placement optimization device (hereinafter referred to as "optimization device" for short) in accordance with this embodiment optimizes placements of a plurality of access points (APs) in a wireless multi-hop network that includes a plurality of wireless terminals as well as the APs as its nodes. The wireless terminal includes, by way of example and is not limited to, a smart meter and a sensor terminal placed to manage a status of a building or the like.

Figure 1:
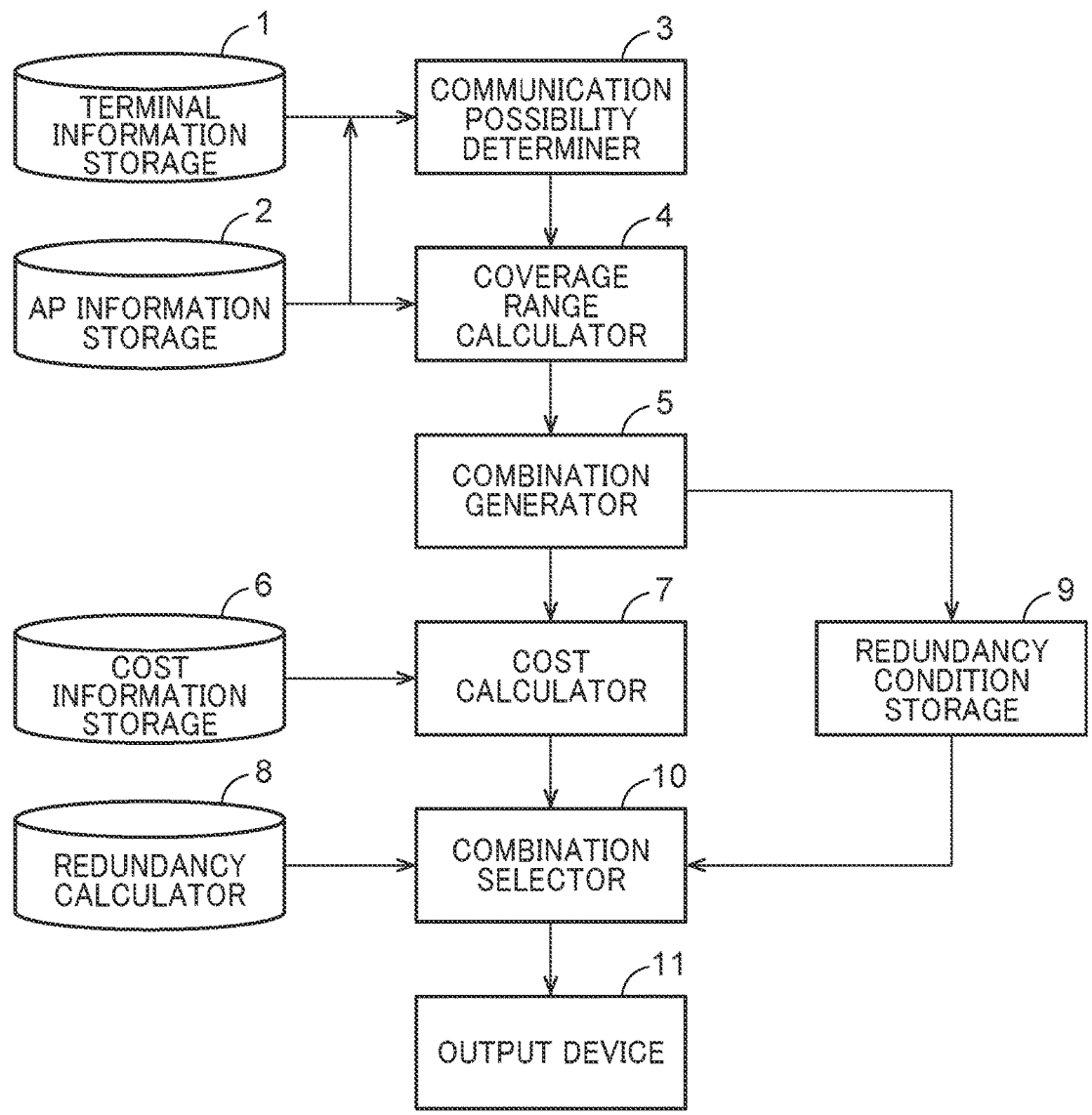
FIG. 1 is a diagram illustrating a functional configuration of an access point placement optimization device in accordance with a first embodiment.

First, a functional configuration of the optimization device in accordance with this embodiment is described with reference to FIGS. 1 to 10. FIG. 1 is a diagram that illustrates the functional configuration of the optimization device in accordance with this embodiment. As illustrated in FIG. 1, the optimization device includes terminal information storage 1, AP information storage 2, a communication possibility determiner 3, a coverage range calculator 4, a combination generator 5, cost information storage 6, a cost calculator 7, a redundancy calculator 8, redundancy condition storage 9, a combination selector 10, and an output device 11.

The terminal information storage 1 is configured to store information regarding wireless terminals (terminal information). The terminal information includes locations of the respective wireless terminals. The "location of the wireless terminal" as used herein includes, by way of example and is not limited to, latitude, longitude, and height. Also, an area in which the wireless multi-hop network is configured may be divided into a plurality of meshes and the location of the wireless terminal may be represented by any one of identifiers of these meshes. Shapes and sizes of the individual meshes may be specified as appropriate.

Figures 2, 3, 4:
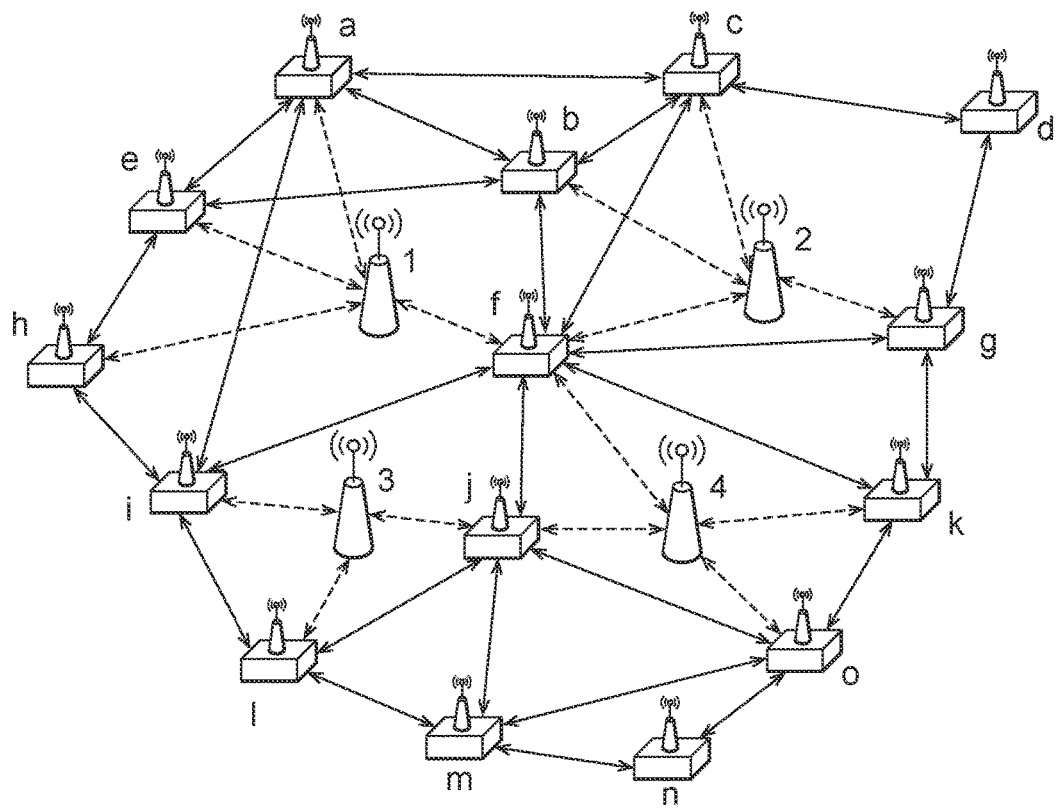
FIG. 2 is a diagram illustrating exemplary terminal information.
FIG. 3 is a diagram illustrating exemplary AP information.
FIG. 4 is a diagram schematically illustrating an exemplary determination result of possibility of communication.

FIG. 2 is a diagram that illustrates an example of the terminal information stored in the terminal information storage 1. Referring to FIG. 2, the terminal information includes x-coordinates and y-coordinates of the respective wireless terminals. For example, the location of the "Wireless Terminal a" is given as (x, y)=(10, 100). The x-coordinate and the y-coordinate may be latitude and longitude, respectively, or vice versa. Also, as described above, the location of the wireless terminal may further include a z-coordinate (height).

Further, the terminal information may include geographical information indicative of a location of a wireless terminal and its vicinity obtained from a geographical information system (GIS).

The AP information storage 2 is configured to store information regarding a candidate AP (AP information). The "candidate AP" as used herein refers to a candidate which is any one of the APs included in the wireless multi-hop network. Accordingly, the location of the candidate AP serves as a candidate for the placement of the AP. The optimization device selects a combination of optimal placements from one or more candidates for the placement of one or more APs by selecting the optimal combination from one or more candidate APs.

The AP information includes locations of the respective candidate APs. The location of an AP includes, by way of example and is not limited to, latitude, longitude, and height. Also, an area in which the wireless multi-hop network is configured may be divided into a plurality of meshes and the location of the candidate AP may be represented by any one of identifiers of these meshes. Shapes and sizes of the individual meshes may be specified as appropriate. Further, the location of the candidate AP may be represented as a point or an area.

Also, the AP information includes respective numbers of allowable hops "K" (≥1) of the respective candidate APs. The number of allowable hops "K" indicates the maximum number of hops through which this candidate AP is allowed to perform communications, and any appropriate value equal to or larger than one is specified therefor. The candidate AP is allowed to gather information from the wireless terminal(s) within the "K" hops.

One and the same value may be specified as the number of allowable hops "K" for all of the candidate APs or different values may be specified as the numbers of allowable hops "K" for the respective candidate APs. For example, the number of allowable hops "K" may be adapted to vary depending on terrains. In this case, a possible approach is to specify a smaller value for the number of allowable hops of a candidate AP placed on a terrain which tends to have obstacles to communications (mountain area, etc.) while specifying a larger value for the number of hops of another candidate AP placed in a terrain which tends to have less obstacles to the communications (flat area, etc.).

FIG. 3 is a diagram that illustrates an example of the AP information stored in the AP information storage 2. Referring to FIG. 3, the AP information includes the number of hops "K," an x-coordinate, and a y-coordinate of each candidate AP. For example, the number of hops "K" of the "Candidate AP1" is specified as two. Specifically, the "Candidate AP1" is allowed to gather information from a wireless terminal within two hops. Also, the location of the "Candidate AP1" is identified as (x, y)=(25, 25). The x-coordinate and the y-coordinate may represent latitude and longitude, respectively, or vice versa. In addition, as described above, the location of the candidate AP may further include a z-coordinate (height).

The communication possibility determiner 3 (hereinafter referred to as "determiner 3" for short) is configured to determine possibilities of communication between a pair of the individual nodes on basis of the terminal information and the AP information. The possibility of communication is represented by availability of communication or a probability of success of communication.

FIG. 4 is a diagram that schematically illustrates a result of determination by the determiner 3. Referring to FIG. 4, a solid arrow interconnects a pair of wireless terminals between which communications can be made whilst a dotted arrow interconnects a wireless terminal and a candidate AP between which communications can be made. For example, the "Wireless Terminal a" is capable of performing communications with the Wireless Terminals b, c, e, i, and the Candidate AP1.

The determiner 3 may, by way of example, calculate a distance between a pair of nodes based on the terminal information and the AP information, determine that communications can be performed between the nodes if the distance is less than a threshold, or determine that communications cannot be made therebetween if the distance is equal to or larger than the threshold. The threshold can be specified as appropriate, e.g., on a per-wireless-terminal basis or per-AP basis.

Also, the determiner 3 may calculate, as the possibility of communication, a probability of success in accordance with the distance between the nodes. In this case, a larger probability of success may or should be specified for a shorter distance.

In addition, when the geographical information is included in the terminal information, the determiner 3 may determine the possibility of communication using the geographical information. For example, a possible approach is to change the above-described threshold in accordance with a terrain between the nodes and a building existing between the nodes, or the like. In this case, if there is any terrain or building that acts as an obstacle to communications between the nodes, the threshold may or should be made small. Also, the determiner 3 may determine that communications cannot be performed if there exists a terrain or building acting as an obstacle to the communications between the nodes.

Further, if actual communication data between the respective wireless terminals can be obtained, the determiner 3 may determine the possibility of communication using the communication data. In this case, the determiner 3 may or should calculate the actual probability of success of communication between the respective wireless terminals on basis of the communication data.

The coverage range calculator 4 is configured to calculate ranges of coverage of the respective candidate APs on basis of the AP information and the result of the determination by the determiner 3. The "covering range" as used herein refers to a range of wireless terminals that a candidate AP covers, i.e., a range (or a set) of wireless terminals with which a candidate AP can perform communications within the "K" hops. In the following, the state where a wireless terminal is included in the covering range of a candidate AP is expressed as "the wireless terminal is covered by the candidate AP."

The coverage range calculator 4 is configured to obtain the number of allowable hops "K" of a candidate AP, refer to the result of the determination by the determiner 3, select the wireless terminal with which the candidate AP is allowed to perform communications within the "K" hops, and thus calculates the covering range of the candidate AP. The coverage range calculator 4 calculates the ranges of coverage for the respective candidate APs in accordance with the above-described method.

Figures 5, 6:
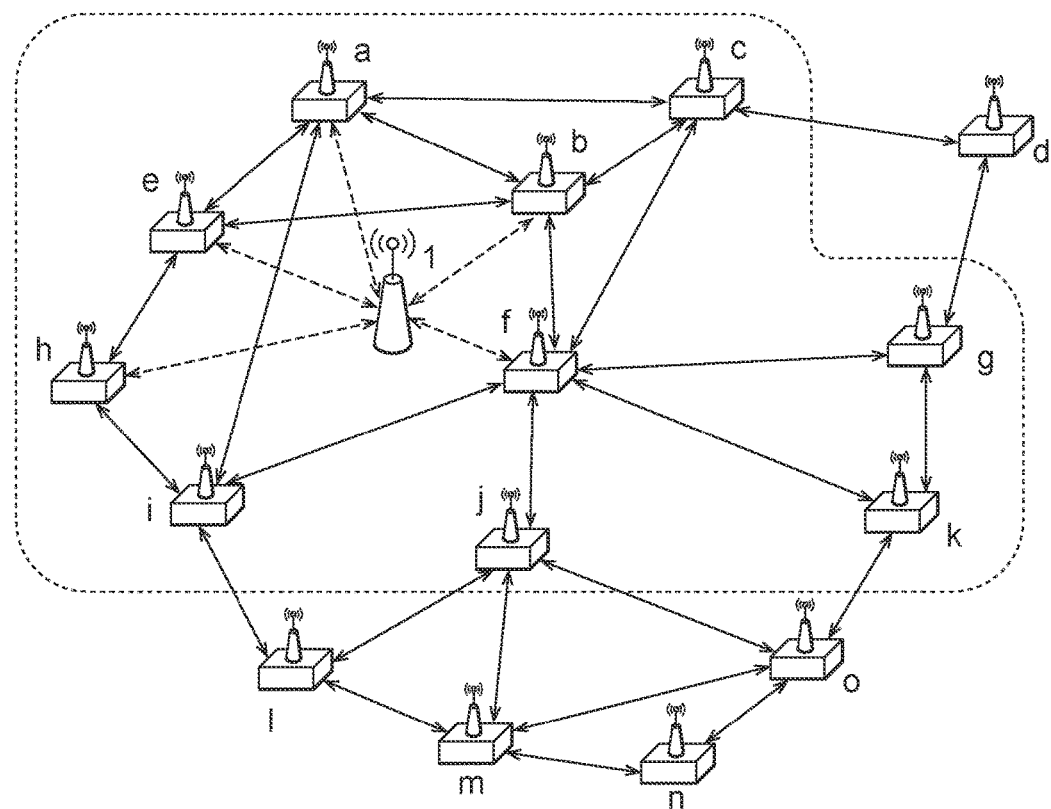
FIG. 5 is a diagram schematically illustrating an exemplary covering range.
FIG. 6 is a diagram illustrating an exemplary covering range in a tabular format.

FIG. 5 is a diagram that schematically illustrates an example of the covering range. Referring to FIG. 5, the range enclosed by a dotted line indicates the covering range of the candidate access point AP1 when the number of allowable hops is specified as two. The Wireless Terminals a, b, c, and so forth are included in the covering range of the candidate access point AP1.

FIG. 6 is a diagram that illustrates an example of the covering range in a tabular format. Referring to FIG. 6, the covering range of the Candidate APs 1 to 4 are illustrated. Referring to FIG. 6, "○" indicates that the candidate AP covers this wireless terminal, and "x" indicates that the candidate AP does not cover this wireless terminal. For example, the "Candidate AP2" covers the "Wireless Terminal b" but does not cover the Wireless Terminals a and c.

The combination generator 5 is configured to generate one or a plurality of combinations of the candidate APs. Any appropriate method for generating the combination(s) by the combination generator 5 may be selected. Possible combinations may be exhaustively generated, or the combinations may be selected in accordance with the optimization method which will be described later.

FIG. 7 is a diagram that illustrates the result of generation of the combinations. Referring to FIG. 7, "○" indicates that the candidate AP is included in this combination, and "x" indicates that the candidate AP is not included in this combination. For example, the "Combination 1" includes the Candidate APs 1 and 3.

The cost information storage 6 is configured to store information regarding costs that vary depending on the placements of the APs (cost information). The cost information includes, by way of example and is not limited to, AP placement cost and AP communication cost, which are costs regarding APs, and isolation cost and non-redundancy cost, which are costs regarding wireless terminals.

The "AP placement cost" is a cost needed to place an AP.

The "AP communication cost" is a communication cost for an AP, if it is placed, to perform communications with the center.

The "isolation cost" is a cost for gathering information of a wireless terminal when this wireless terminal is not covered by any one of the APs. The isolation cost is, by way of example, a communication cost for the wireless terminal to transmit information directly to the center.

The "non-redundancy cost" is a cost for gathering information of a wireless terminal when this wireless terminal is not covered by a predetermined number of APs. The non-redundancy cost corresponds to a cost for gathering the information of the wireless terminal when the predetermined number of APs have broken down. The non-redundancy cost is, by way of example, the communication cost for the wireless terminal to transmit information directly to the center. More than one non-redundancy cost may be specified per number of APs covering the wireless terminal.

It should be noted that the above-described communication cost may take a fixed value or a variable value per period, or may include both of the fixed and variable values. Also, one and the same value may be specified as the AP placement cost and the AP communication cost for all of the candidate APs, or different values may be specified for the individual candidate APs. Further, one and the same value may be specified as the isolation placement cost and the non-redundancy cost for all of the wireless terminals, or different values may be specified for the individual wireless terminals.

FIG. 8 is a diagram that illustrates an example of the cost information. Referring to FIG. 8, the cost information includes the AP placement cost, the AP communication cost, the isolation cost, and the non-redundancy cost. For example, the placement cost of the "Candidate AP1" is specified as "10000" and the AP communication cost of the Candidate AP1 is specified as "2000" whilst the isolation cost of the "Wireless Terminal a" is specified as "2000" and the non-redundancy cost of the "Wireless Terminal a" is specified as "1000."

The cost calculator 7 is configured to calculate the costs of the respective combinations generated by the combination generator 5 on basis of the ranges of coverage of the individual candidate APs and the cost information. The "cost of the combination" is the cost incurred by placing the APs in accordance with this combination. For example, when the cost of the "Combination 1" of FIG. 7 is to be calculated, the cost calculator 7 calculates the cost that will be incurred by placing the Candidate APs 1 and 3.

The redundancy calculator 8 is configured to calculate the redundancies of the respective combinations generated by the combination generator 5 on basis of the ranges of coverage of the respective candidate APs. The "redundancy of the combination" is the redundancy in the case where the APs are placed in accordance with this combination. For example, if the redundancy of the "Combination 1 " of FIG. 7 is to be calculated, the redundancy calculator 8 calculates the redundancy in the case where the Candidate APs 1 and 3 are placed. The redundancy calculated by the redundancy calculator 8 includes, but is not limited to, an "AP multiplicity" and a "wireless terminal multiplicity."

The AP multiplicity is the number of the APs that cover the respective wireless terminals. For example, if the "Wireless Terminal a" is covered by two APs, i.e., the APs 1 and 2, then the AP multiplicity of the "Wireless terminal a" is given as two.

The wireless terminal multiplicity is the number of transmission paths with which the respective wireless terminals can transmit information to any one of the APs. For example, if the "Wireless Terminal a" has a transmission path with which it transmits the information to the AP1 via the "Wireless Terminal b" and another transmission path with which it transmits the information to the AP2 via the "Wireless Terminal c," then the wireless terminal multiplicity of the "Wireless Terminal a" is given as two.

The redundancy condition storage 9 stores a "redundancy condition." The redundancy condition is a condition regarding redundancy which a wireless multi-hop network formed by placing APs has to meet. The redundancy condition includes, by way of example and is not limited to, a "minimum AP multiplicity" and a "minimum wireless terminal multiplicity." FIG. 9 is a diagram that illustrates an example of the redundancy condition.

The minimum AP multiplicity is a minimum value of the AP multiplicity which the individual wireless terminals have to have. For example, as illustrated in FIG. 9, if the minimum AP multiplicity is two, then the individual wireless terminals have to have the AP multiplicity of not less than two. This corresponds to the fact that the wireless terminals have to have reliability ensuring that the information of the individual wireless terminals can be transmitted, despite failure in one AP, to another AP.

The minimum wireless terminal multiplicity is a minimum value of the wireless terminal multiplicity which the individual wireless terminals have to have. For example, as illustrated in FIG. 9, if the minimum wireless terminal multiplicity is two, then the individual wireless terminals have to have the wireless terminal multiplicity of not less than two. This corresponds to the fact that the wireless terminals have to have reliability ensuring that the information of the individual wireless terminals can be transmitted, despite failure in one wireless terminal on a transmission path, to the AP using another transmission path.

It should be noted that the redundancy condition may be applied to the entire wireless multi-hop network or different redundancy conditions may be applied depending on the regions and/or the wireless terminals.

The combination selector 10 is configured to select the optimal combination from the one or more combinations generated by the combination generator 5. The "optimal combination" as used herein refers to a combination that ensures that the redundancy of the combination satisfies the redundancy condition and the cost of the combination is minimized.

The output device 11 is configured to output the result of optimization by the optimization device. The term "output" as used herein may refer to displaying the result of optimization on a display device 103 which will be described later and transmitting the result of optimization to an external device. By way of example, the result of optimization includes, but is not limited to, the optimal combination selected by the combination selector 10. The output device 11 may output, as the result of optimization, the ranges of coverage and redundancies of the respective wireless terminals in the optimal combination.

Figures 10, 11:
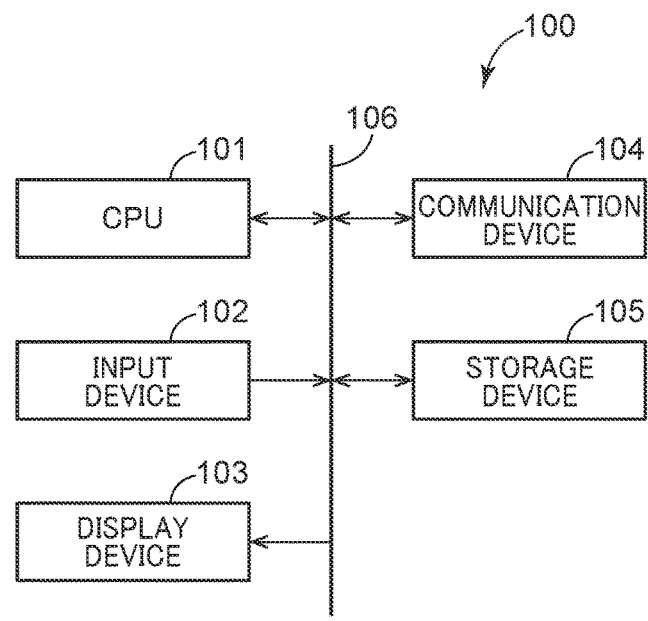
FIG. 10 is a diagram illustrating an exemplary result of optimization.
FIG. 11 is a diagram illustrating a hardware configuration of the access point placement optimization device of FIG. 1.

FIG. 10 is a diagram that illustrates an example of the result of optimization which the output device 11 causes the display device 103 to display. The upper side of the FIG. 10 indicates the optimal combination and the lower side the ranges of coverage and the AP multiplicities in the optimal combination.

Referring to FIG. 10, the Candidate APs 1, 3, and 4 constitute the optimal combination. This indicates that the placements of the APs can be optimized by placing the APs at the placements of the Candidate APs 1, 3, and 4, respectively. Also, it is indicated in this context that the AP placed at the placement of the Candidate AP1 covers the Wireless Terminals a, b, and c with the AP multiplicity of the "Wireless Terminal a" given as three, and the like.

The hardware configuration of the optimization device in accordance with this embodiment is described now with reference to FIG. 11. The optimization device in accordance with this embodiment is configured by a computer 100 as illustrated in FIG. 11. The computer 100 includes a central processing unit (CPU) 101, an input device 102, a display device 103, a communication device 104, and a storage device 105, which are interconnected via a bus 106.

The CPU 101 is a control device and arithmetic device of the computer 100. The CPU 101 performs arithmetic processing on basis of the data and programs input from the individual devices interconnected thereto via the bus 106 (e.g., the input device 102, the communication device 104, and the storage device 105) and outputs arithmetic results and control signals to the individual devices connected thereto via the bus 106 (e.g., the display device 103, the communication device 104, and the storage device 105).

Specifically, the CPU 101 is configured to execute the operating system (OS) of the computer 100, the AP placement optimization program (hereinafter referred to as "optimization program" for short) and the like, and controls the individual devices constituting the computer 100. The optimization program is a program that causes the computer 100 to realize the above-described individual functional features of the optimization device. The computer 100 functions as the optimization device when the CPU 101 executes the optimization program.

The input device 102 is a device for inputting information in the computer 100. The input device 102 may include, by way of example and is not limited to, a keyboard, a mouse, and a touch panel. A user can enter information such as the terminal information, the AP information, the cost information, and the redundancy condition by using the input device 102.

The display device 103 is a device that displays images and videos. The display device 103 includes, by way of example and is not limited to, a liquid crystal display (LCD), a cathode-ray tube (CRT), and a plasma display panel(PDP). The output device 11 can cause the display device 103 to display the result of optimization.

The communication device 104 is a device for the computer 100 to perform communications in a wired or wireless manner with an external device such as a wireless terminal and an AP. The communication device 104 includes, by way of example and is not limited to, a modem, a hub, and a router. The information such as the terminal information, the AP information, the cost information, and the redundancy condition may be entered via the communication device 104 from an external device.

The storage device 105 is a storage medium that stores the operating system of the computer 100, the optimization program, data necessary to run the optimization program, data generated by execution of the optimization program, and the like. The storage device 105 includes a main storage device and an external storage device. The main storage device includes, by way of example and is not limited to, RAM, DRAM, and SRAM. Also, the external storage device includes, by way of example and is not limited to, a hard disk, an optical disk, flash memory, and a magnetic tape. The terminal information storage 1, the AP information storage 2, the cost information storage 6, and the redundancy condition storage 8 can be configured using the storage device 105.

It should be noted that one or more of the computer 100, the CPU 101, the input device 102, the display device 103, the communication device 104, and the storage device 105 may be provided. Also, peripheral devices such as a printer and a scanner may be connected to the computer 100.

Also, the optimization device may be configured by one single computer 100 or may be configured as a system constituted by multiple interconnected computers 100.

Further, the optimization program may be stored in advance in the storage device 105 of the computer 100, stored in a storage medium such as CD-ROM, or uploaded onto the Internet. In any case, the optimization device can be configured by placing the optimization program on the computer 100 and executing the program.

(Access Point Placement Optimization Method)

An access point placement optimization method (or "optimization method" for short) in accordance with one embodiment is now described with reference to FIGS. 12 to 17.

(First Embodiment)

Figure 12:
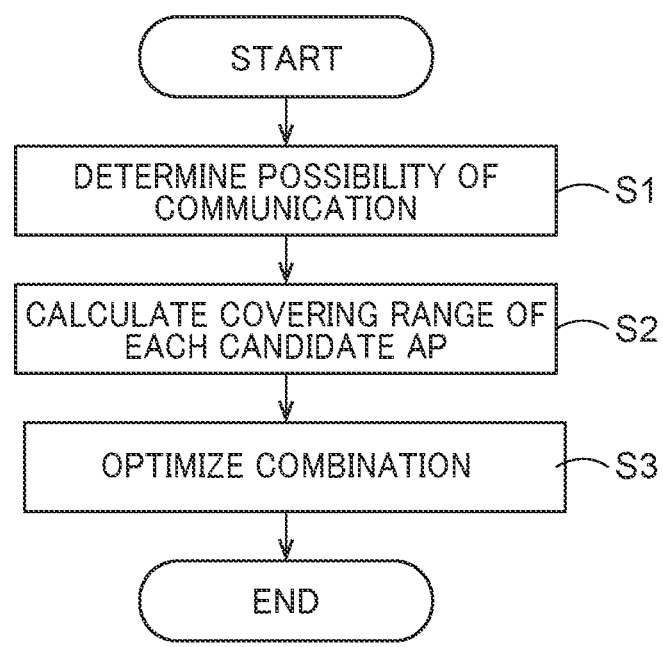
FIG. 12 is a flowchart illustrating operation of the access point placement optimization device of FIG. 1.
Figure 13:
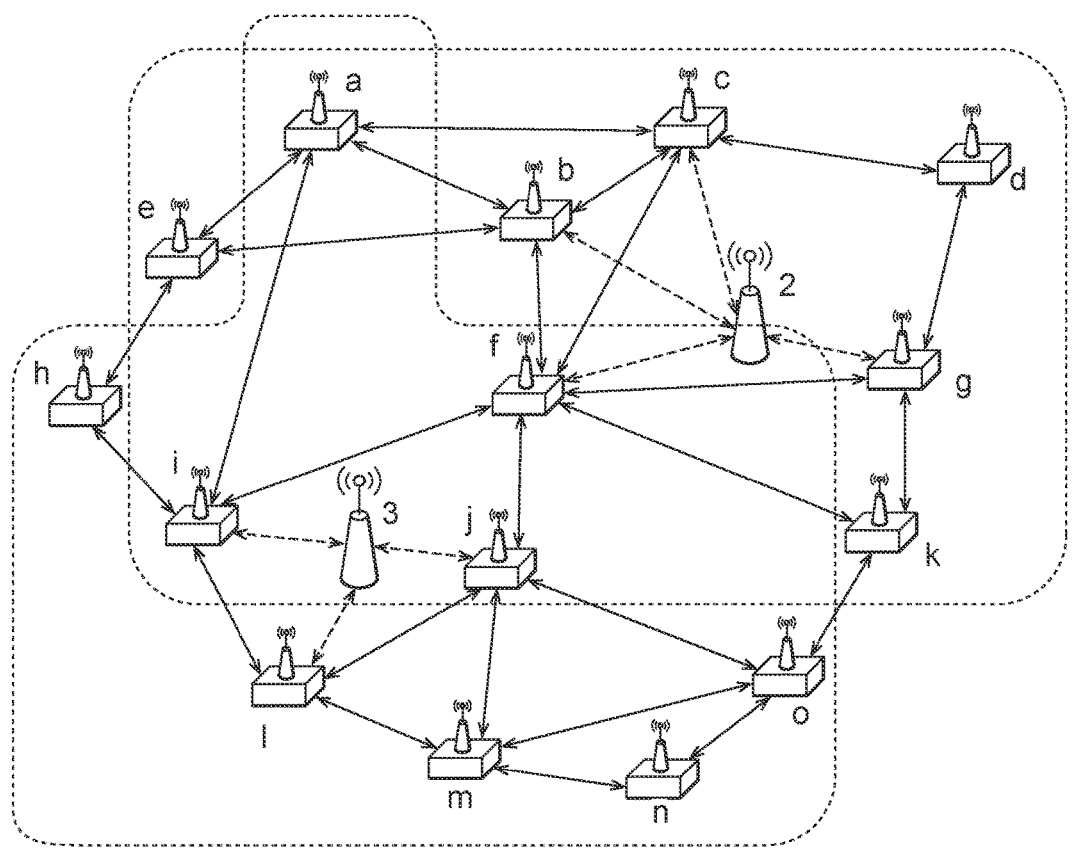
FIG. 13 is a diagram illustrating an exemplary result of optimization and an exemplary covering range.

First, the optimization method under the redundancy condition to the effect that the AP multiplicity is not less than one is described with reference to FIGS. 12 and 13. According to this embodiment, the optimization device optimizes the placements of the APs such that all the wireless terminals are covered by at least one AP and the costs regarding the APs are minimized. It is assumed in the following descriptions that the costs regarding the APs are each given as a sum of the AP placement cost and the AP communication cost. FIG. 12 is a flowchart that illustrates an example of the operation of the optimization device that carries out such an optimization.

In the step S1, the determiner 3 obtains the terminal information and the AP information and determines the possibilities of communication between the individual nodes. The method of determining the possibilities of communication has already been described in the foregoing. In accordance with this embodiment, the determiner 3 outputs the result of determination of the possibilities of communication as the availability of communication, and it is assumed here that the result of determination as illustrated in FIG. 4 can be obtained.

In the step S2, the coverage range calculator 4 obtains the result of determination of the possibility of communication and the numbers of allowable hops "K" of the respective candidate APs, and calculates the ranges of coverage of the respective candidate APs. As described above, the covering range of a candidate AP is a set of wireless terminals with which this candidate AP can perform communications within the "K" hops. The coverage range calculator 4 can calculate the covering range using known methodology such as Dijkstra's algorithm.

In the step S3, the optimization device optimizes the combination of the candidate APs. Specifically, the following optimization problem should be solved by the combination generator 5, the cost calculator 7, the redundancy calculator 9, and the combination selector 10.

[Math. 1]

$$\min \Sigma_{m \in \mathcal{M}} C_m \chi_m \quad (1)$$

$$\text{s.t. } \Sigma_{m \in \mathcal{M}} A_{mn} \chi_m \geq 1, \forall n \in \mathcal{N} \quad (2)$$

$$\chi_m \in \{0,1\} \forall m \in \mathcal{M} \quad (3)$$

The variables that appear in the above expressions (1) to (3) are defined as follows.

"$x_m$" is a variable which takes 1 if an AP is placed at the placement of the candidate $AP_m$ (the combination includes the candidate $AP_m$) and takes 0 if the AP is not placed at the placement (the combination does not include the candidate $AP_m$).

"M" is a set of the candidate APs (M={1, 2, ..., M}).

"N" is a set of the wireless terminals (N={1, 2, ..., N}).

"m" is an ID of a candidate AP.

"n" is an ID of a wireless terminal.

"$C_m$" is the cost incurred by placing an AP at the placement of the candidate $AP_m$ (where the combination includes the candidate $AP_m$) (AP placement cost+AP communication cost=12,000 JPY).

"$A_{mn}$" is a variable which takes 1 if the candidate $AP_m$ covers the "wireless terminal n" when placing an AP at the placement of the candidate $AP_m$ (where the combination includes the candidate $AP_m$) and takes 0 if the candidate $AP_m$ does not cover the "wireless terminal n."

The expression (1) is an objective function of the optimization problem to obtain the combination of the candidate $AP_m$ that minimizes the costs regarding the APs. The expression (2) serves as the constraint for the combination of the candidate APs to the effect that all of the "wireless terminals n" are covered by any one of the candidate APs. Specifically, the expression (2) constrains the combinations such that the combinations satisfy the redundancy condition.

For example, if the result of determination of the possibility of communication is given as illustrated in FIG. 4, the numbers of allowable hops "K" of the candidate AP1 to AP4 are given as "2," and the IDs "a" to "o" of the wireless terminals correspond by definition to the values 1 to 15, respectively, then the above optimization problem will be expressed as follows:

[Math. 2]

$$\min \sum_{m=1}^{4} 12 x_m \quad (4)$$

$$x_1 + x_2 + x_3 \geq 1 \quad (5)$$

$$x_1 + x_2 + x_4 \geq 1 \quad (6)$$

$$x_1 + x_2 + x_4 \geq 1 \quad (7)$$

$$x_2 \geq 1 \quad (8)$$

$$x_1 + x_2 \geq 1 \quad (9)$$

$$x_1 + x_2 + x_3 + x_4 \geq 1 \quad (10)$$

$$x_1 + x_2 + x_4 \geq 1 \quad (11)$$

$$x_1 + x_3 \geq 1 \quad (12)$$

$$x_1 + x_2 + x_3 + x_4 \geq 1 \quad (13)$$

$$x_1 + x_2 + x_3 + x_4 \geq 1 \quad (14)$$

$$x_1 + x_2 + x_4 \geq 1 \quad (15)$$

$$x_3 + x_4 \geq 1 \quad (16)$$

$$x_3 + x_4 \geq 1 \quad (17)$$

$$x_3 + x_4 \geq 1 \quad (18)$$

$$x_3 + x_4 \geq 1 \quad (19)$$

If this problem is solved, then $x_2=x_3=1$ whilst the remaining members are 0, so that the value of the objective function will be 24,000 JPY (12,000 JPY×2). In other words, the combination selector 10 selects the combination of the candidate access points AP2 and AP3 as the optimal combination of the candidate AP. FIG. 13 is a diagram that illustrates such a result of optimization and the ranges of coverage. As illustrated in FIG. 13, it is appreciated from this result of optimization that all the wireless terminals are covered by either one of the candidate access points AP2 and AP3.

Any solutions may be selected as appropriate to solve the above-described optimization problem. For example, in order to solve the optimization problem, optimization solvers such as CPLEX which is a solver for obtaining a strictly optimum solution, Simulated Annealing which is methodology for obtaining a locally optimum solution, and heuristic approaches such as Tabu Search may be used. In addition, methodology may be used which initially generates an initial solution of the combination of the candidate APs and repeatedly generates better solutions of the combination until the stoppage condition is satisfied.

According to such an optimization method, it is made possible to select the combination of the placements of the APs that ensures that all the wireless terminals are covered by at least one AP and minimizes the costs regarding the APs.

(Second Embodiment)

Next, the optimization method in a case where no redundancy condition is specified is described. According to this embodiment, in contrast to the first embodiment, it may happen that a combination according to which a wireless terminal is not covered by any one of the APs becomes the optimum solution. In view of this, the optimization device optimizes the placements of the APs such that the total cost is minimized taking into account the cost (isolation cost) incurred when the wireless terminal is not covered.

In this embodiment, the optimization device should solve the following optimization problem in the step S3.

[Math. 3]

$$\min \Sigma_{m \in \mathcal{M}} C_m \chi_m + \Sigma_{n \in \mathcal{N}} D_n y_n \quad (21)$$

$$\text{s.t. } \Sigma_{m \in \mathcal{M}} A_{mn} \chi_m + y_n \geq 1, \forall n \in \mathcal{N}, \quad (22)$$

$$\chi_m, y_n \in \{0, 1\} \; \forall m \in \mathcal{M}, \forall n \in \mathcal{N}. \quad (23)$$

The variables that appear in the above expressions (21) to (23) are defined as follows.

"$Y_n$" is a variable that takes 1 if the "wireless terminal n" is not covered by any one of the candidate APs, and otherwise takes 0.

"$D_n$" is the cost regarding the wireless terminal in a case where the "wireless terminal n" is not covered by any one of the candidate APs (isolation cost=2,000 JPY).

The expression (21) is an objective function of the optimization problem to obtain the combination of the candidate access points $AP_m$ that minimizes the total cost. The expression (22) provides a constraint such that "$y_n$" becomes 1 when the "wireless terminal n" is not covered by any one of the candidate APs, i.e., such that the isolation cost is incurred.

For example, if the result of determination of the possibility of communication is given as illustrated in FIG. 4, the numbers of allowable hops "K" of the candidate access points AP1 to AP4 are given as "2," and the IDs "a" to "o" of the wireless terminals correspond by definition to the values 1 to 15, respectively, then the above optimization problem will be expressed as follows:

[Math. 4]

$$\min \sum_{m=1}^{4} 12 x_m + \sum_{n=1}^{15} 2 y_n \quad (24)$$

$$x_1 + x_2 + x_3 + y_1 \geq 1 \quad (25)$$

$$x_1 + x_2 + x_4 + y_2 \geq 1 \quad (26)$$

$$x_1 + x_2 + x_4 + y_3 \geq 1 \quad (27)$$

$$x_2 + y_4 \geq 1 \quad (28)$$

$$x_1 + x_2 + y_5 \geq 1 \quad (29)$$

$$x_1 + x_2 + x_3 + x_4 + y_6 \geq 1 \quad (30)$$

$$x_1 + x_2 + x_4 + y_7 \geq 1 \quad (31)$$

$$x_1 + x_3 + y_8 \geq 1 \quad (32)$$

$$x_1 + x_2 + x_3 + x_4 + y_9 \geq 1 \quad (33)$$

$$x_1 + x_2 + x_3 + x_4 + y_{10} \geq 1 \quad (34)$$

$$x_1 + x_2 + x_4 + y_{11} \geq 1 \quad (35)$$

$$x_3 + x_4 + y_{12} \geq 1 \quad (36)$$

$$x_3 + x_4 + y_{13} \geq 1 \quad (37)$$

$$x_3 + x_4 + y_{14} \geq 1 \quad (38)$$

$$x_3 + x_4 + y_{15} \geq 1 \quad (39)$$

If this problem is solved, then $x_2 = x_3 = 1$ whilst the remaining members are 0, so that the value of the objective function will be 24,000 JPY (12,000 JPY×2+2,000 JPY×0). In other words, the combination selector 10 selects the combination of the candidate access points AP2 and AP3 as the optimal combination of the candidate APs.

In this embodiment, when a wireless terminal is not covered, the cost is incurred according to the second term of the expression (24). As a result, although the redundancy condition is not specified, the same result as that of optimization of the first embodiment was obtained as the result of minimizing the cost.

According to such an optimization method, it is made possible to select the combination of the placements of the APs that minimizes the total cost regarding wireless terminals and the APs without specifying any redundancy condition.

(Third Embodiment)

Next, the optimization method under the redundancy condition to the effect that the AP multiplicity is equal to or larger than "S" (S≥2) is described. According to this embodiment, the optimization device optimizes the placements of the APs such that as many wireless terminals as possible are covered by "S" or more APs and the total cost is minimized.

In this embodiment, the optimization device should solve the following optimization problem in the step S3.

[Math. 5]

$$\min \Sigma_{m \in \mathcal{M}} C_m \chi_m + \Sigma_{n \in \mathcal{N}} D_n y_n + \Sigma_{n \in \mathcal{N}} E_n z_n \quad (40)$$

$$\text{s.t. } \Sigma_{m \in \mathcal{M}} A_{mn} \chi_m + y_n \geq 1, \forall n \in \mathcal{N}, \quad (41)$$

$$\Sigma_{m \in \mathcal{M}} A_{mn} \chi_m + S z_n \geq S, \forall n \in \mathcal{N}, \quad (42)$$

$$\chi_m, y_n, z_n \in \{0,1\} \; \forall m \in \mathcal{M}, \forall n \in \mathcal{N}. \quad (43)$$

The variables that appear in the above expressions (40) to (43) are defined as follows.

"S" is the AP multiplicity serving as the redundancy condition.

"$z_n$" is a variable that takes 1 if the "wireless terminal n" is not covered by "S" or more candidate APs, and otherwise takes 0.

"$E_n$" is the cost regarding the wireless terminal in a case where the "wireless terminal n" is not covered by "S" or more APs (non-redundancy cost=1,000 JPY).

The expression (40) is an objective function of the optimization problem to obtain the combination of the candidate access points $AP_m$ that minimizes the total cost. The expression (41) provides a constraint such that "$y_n$" becomes 1 when the "wireless terminal n" is not covered by any one of the candidate APs, i.e., such that the isolation cost is incurred. The expression (42) provides a constraint such that "$z_n$" becomes 1 when the "wireless terminal n" is not covered by "S" or more candidate APs, i.e., the non-redundancy cost is incurred.

For example, if the result of the determination of the possibility of communication is given as illustrated in FIG. 4, the numbers of allowable hops "K" of the candidate access points AP1 to AP4 are given as 2, the AP multiplicity "S" is two, and the IDs "a" to "o" of the wireless terminals correspond by definition to the values 1 to 15, respectively, then the above optimization problem will be expressed as follows:

[Math. 6]

$$\min \sum_{m=1}^{4} 12 x_m + \sum_{n=1}^{15} 2 y_n + \sum_{n=1}^{15} z_n \quad (44)$$

$$x_1 + x_2 + x_3 + y_1 \geq 1 \quad (45)$$

$$x_1 + x_2 + x_4 + y_2 \geq 1 \quad (46)$$

$$x_1 + x_2 + x_4 + y_3 \geq 1 \quad (47)$$

$$x_2 + y_4 \geq 1 \quad (48)$$

$$x_1 + x_2 + y_5 \geq 1 \quad (49)$$

$$x_1 + x_2 + x_3 + x_4 + y_6 \geq 1 \quad (50)$$

$$x_1 + x_2 + x_4 + y_7 \geq 1 \quad (51)$$

$$x_1 + x_3 + y_8 \geq 1 \quad (52)$$

$$x_1 + x_2 + x_3 + x_4 + y_9 \geq 1 \quad (53)$$

$$x_1 + x_2 + x_3 + x_4 + y_{10} \geq 1 \quad (54)$$

$$x_1 + x_2 + x_4 + y_{11} \geq 1 \quad (55)$$

$$x_3 + x_4 + y_{12} \geq 1 \quad (56)$$

$$x_3 + x_4 + y_{13} \geq 1 \quad (57)$$

$$x_3 + x_4 + y_{14} \geq 1 \quad (58)$$

$$x_3 + x_4 + y_{15} \geq 1 x_1 + x_2 + x_3 + 2 z_1 \geq 2 \quad (59)$$

$$x_1 + x_2 + x_4 + 2 z_2 \geq 2 \quad (60)$$

$$x_1 + x_2 + x_4 + 2 z_3 \geq 2 \quad (61)$$

$$x_2 + 2 z_4 \geq 2 \quad (62)$$

$$x_1 + x_2 + 2 z_5 \geq 2 \quad (63)$$

$$x_1 + x_2 + x_3 + x_4 + 2 z_6 \geq 2 \quad (64)$$

$$x_1 + x_2 + x_4 + 2 z_7 \geq 2 \quad (65)$$

$$x_1 + x_3 + 2 z_8 \geq 2 \quad (66)$$

$$x_1 + x_2 + x_3 + x_4 + 2 z_9 \geq 2 \quad (67)$$

$$x_1 + x_2 + x_3 + x_4 + 2 z_{10} \geq 2 \quad (68)$$

$$x_1 + x_2 + x_4 + 2 z_{11} \geq 2 \quad (69)$$

$$x_3 + x_4 + 2 z_{12} \geq 2 \quad (70)$$

$$x_3 + x_4 + 2 z_{13} \geq 2 \quad (71)$$

$$x_3 + x_4 + 2 z_{14} \geq 2 \quad (72)$$

$$x_3 + x_4 + 2 z_{15} \geq 2 \quad (73)$$

Figure 14:
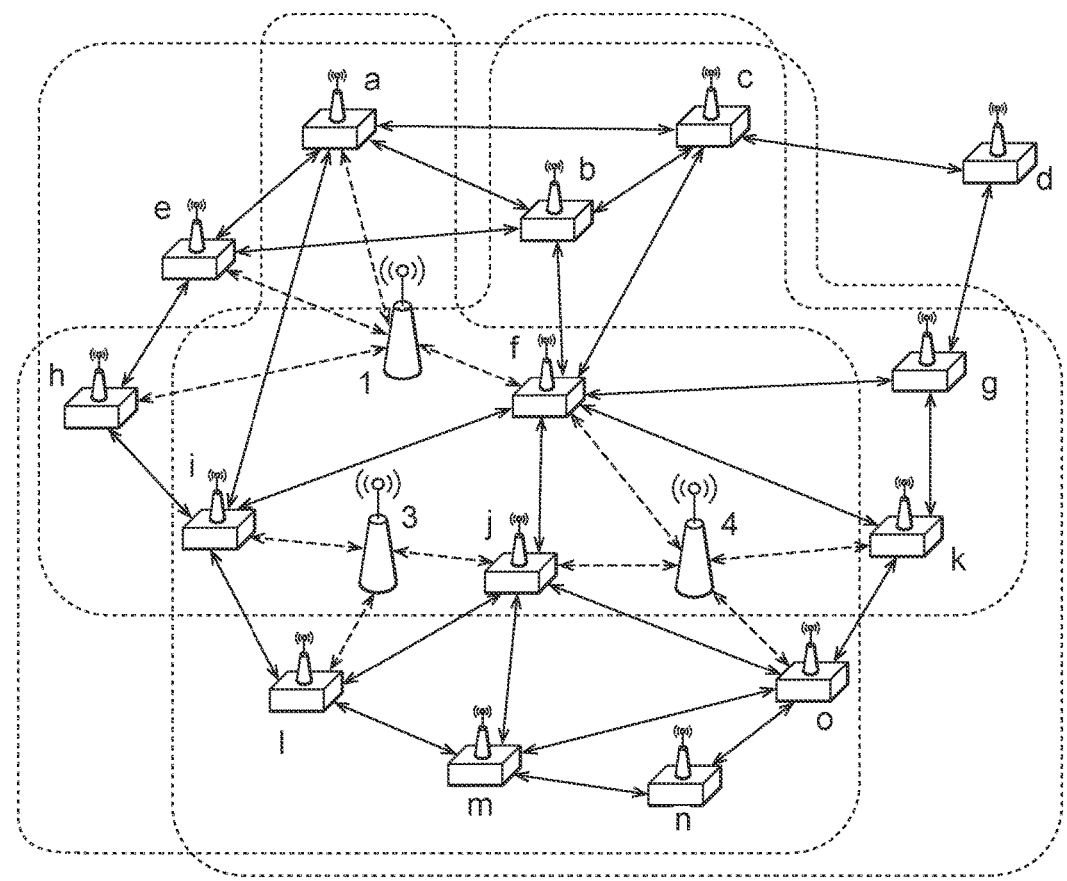
FIG. 14 is a diagram illustrating another exemplary result of optimization and another exemplary covering range.

If this problem is solved, then $x_1=x_3=x_4=1$, $y_4=1$, $z_4=z_5=1$ whilst the remaining members are 0, so that the value of the objective function will be 40,000 JPY (=12,000 JPY×3+2,000 JPY×1+1,000 JPY×2). In other words, the combination selector 10 selects the combination of the candidate access points AP1, AP3, and AP4 as the optimal combination of the candidate AP. FIG. 14 is a diagram that illustrates such a result of optimization and the ranges of coverage. As illustrated in FIG. 14, it will be appreciated from this result of optimization that the AP multiplicities of all the wireless terminals except for the wireless terminals d and e are not less than two.

According to such an optimization method, it is made possible to select the combination of the placements of the APs ensuring that the AP multiplicities of as many wireless terminals as possible becomes equal to or larger than "S" and the total cost is minimized.

By virtue of this, it is made possible to form a wireless multi-hop network having redundancy to the effect that as many wireless terminals as possible can normally perform communications even when "S−1" APs break down.

(Fourth Embodiment)

Next, the optimization method under the redundancy condition to the effect that the wireless terminal multiplicity is two is described with reference to FIG. 16. According to this embodiment, the optimization device optimizes the placements of the APs such that the wireless terminals have two or more transmission paths and the costs are minimized. In the following, the step S2 in this embodiment is described.

Figure 15:
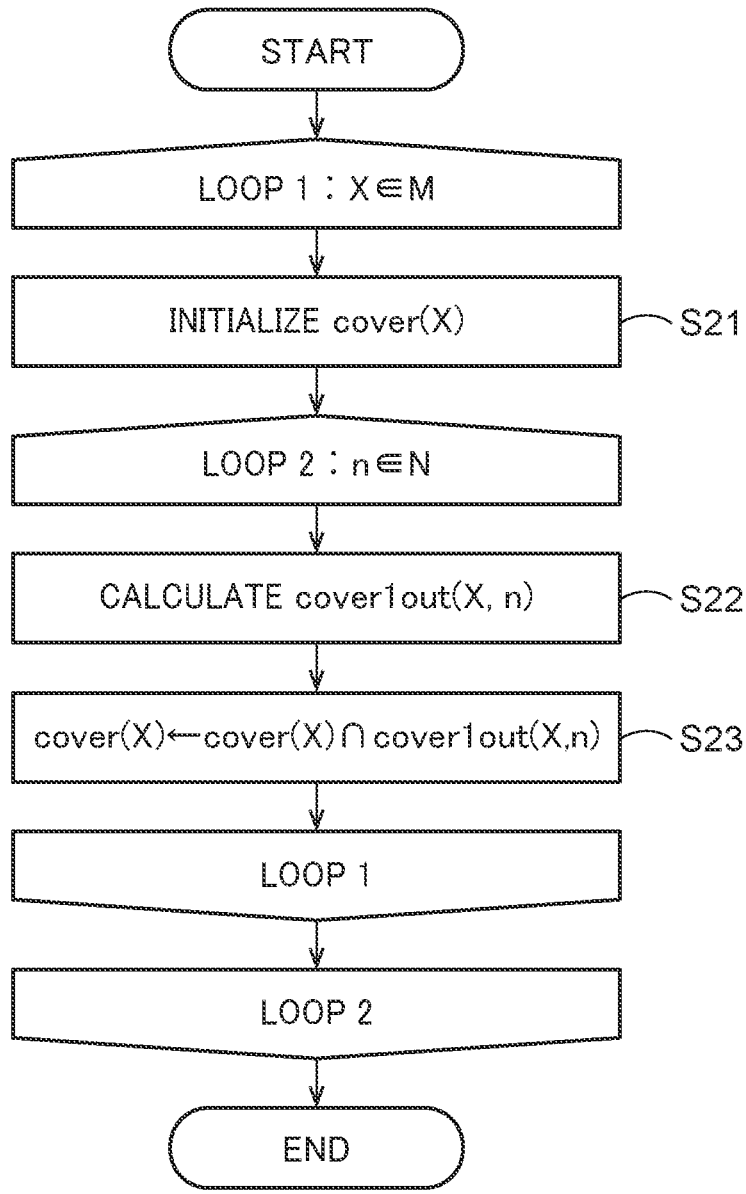
FIG. 15 is a flowchart illustrating a method of calculating the covering range.

FIG. 15 is a flowchart that illustrates the method of calculation of the ranges of coverage in this embodiment. As illustrated in FIG. 15, the coverage range calculator 4 repeats the processing in the loop 1 for the respective candidate access points APX (X∈M). The loop 1 includes the step S21 and a loop 2.

In the step S21, the coverage range calculator 4 initializes the ranges of coverage cover(X) of the candidate access points APX so that they each cover all the wireless terminals (cover(X) ={1, 2, . . . , N}).

In the loop 2, the processing of the steps S22 and S23 is repeated for the respective wireless terminals n.

In the step S22, the coverage range calculator 4 calculates the covering range cover1out(X, n). The covering range cover1out(X, n) is the covering range of the candidate access point APX in the case where the wireless terminal n does not exist. The covering range cover1out(X, n) includes, for the sake of explanation, the wireless terminal n.

In the step S23, the coverage range calculator 4 calculates a product set of the covering range cover(X) and the covering range cover1out(X, n). This product set serves as the new covering range cover(X).

Here, the method of calculation of the covering range is specifically described with reference to FIG. 16. The following describes the method of calculation of the covering range of the candidate access point AP1 (X=1) for which the number of allowable hops "K" is specified.

First, the coverage range calculator 4 initializes the covering range of the candidate access point AP1 in the step S21 (cover(1)={a, b, . . . , o}).

Next, in the step S22, the coverage range calculator 4 selects the "wireless terminal a" and calculates the covering range of the candidate access point AP1 in the case where the "wireless terminal a" does not exist. As illustrated in FIG. 16, the wireless terminals b, c, e, f, g, h, i, j, and k are allowed to perform communications with the candidate access point AP1 within two hops even when the "wireless terminal a" does not exist. Accordingly, cover1out(1, a)={a, b, c, e, f, g, h, i, j, k} will result. As described above, Cover1out(1, a) includes, for the sake of explanation, the wireless terminal a.

Subsequently, in the step S23, the coverage range calculator 4 calculates a product set of the cover(1) and the cover1out(1, a). The product set will be given as {a, b, c, e, f, g, h, i, j, k}, which serves as the new covering range cover(1).

Next, the coverage range calculator 4 selects the "wireless terminal b" in the step S22. The covering range will be given as Cover1out(1, b) = {a, b, c, e, f, g, h, i, j, k}. In addition, the coverage range calculator 4 calculates a new cover(1) based on the cover(1) and the cover1out(1, b).

The coverage range calculator 4 repeats the same processing for the other wireless terminals, and outputs the cover(1) at the time point at which the processing was completed for all of the wireless terminals as the covering range of the candidate access point AP1. As a result, the covering range of the candidate access point AP1 will be given as cover(1)={a, b, c, e, f, h, i}.

Figures 16, 17:
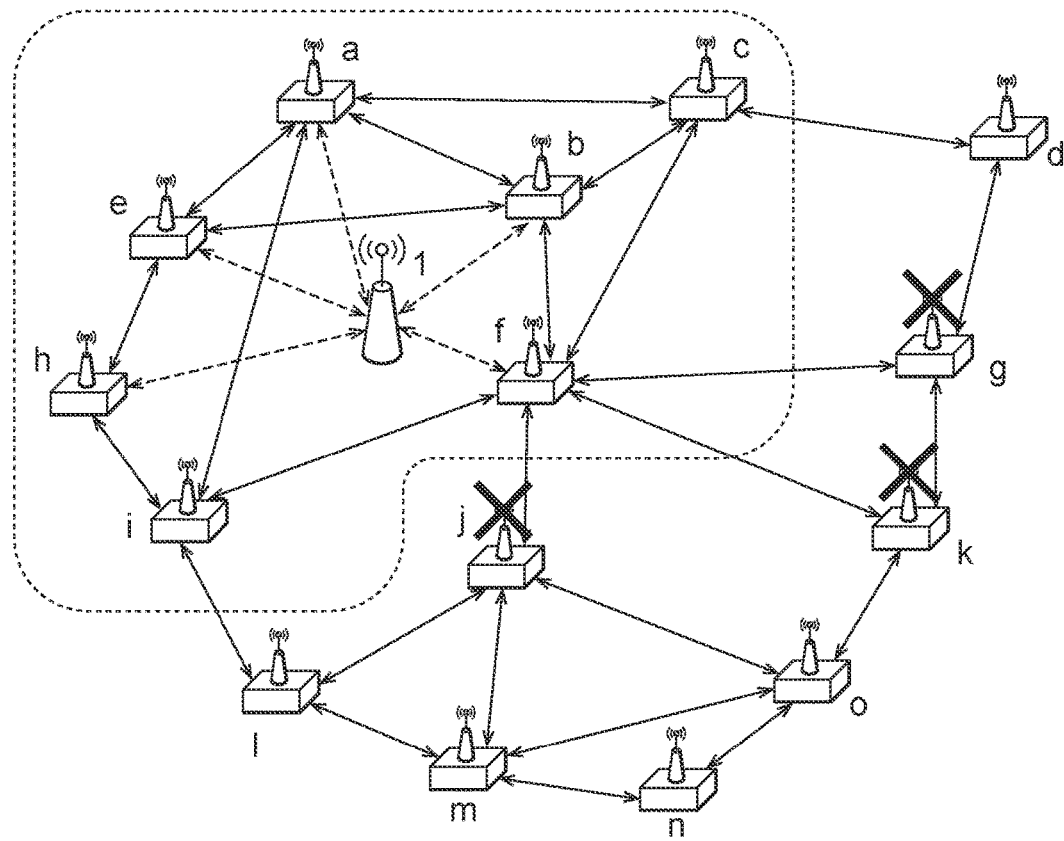
FIG. 16 is a diagram for explanation of the method of calculating the covering range.
FIG. 17 is a diagram illustrating an exemplary probability of coverage.

As illustrated in FIG. 16, the above wireless terminal included in the covering range of the candidate access point AP1 has two or more transmission paths that lead to the candidate access point AP1. Also, it will be appreciated that the wireless terminals g, j, and k which have been excluded from the covering range of the candidate access point AP1 in FIG. 5 have only one transmission path that leads to the candidate access point AP1.

The coverage range calculator 4 calculates the ranges of coverage of the respective candidate APs in accordance with such a method. The optimization device solves the optimization problem on basis of the ranges of coverage that have been calculated, and it is thus made possible to select the combination of the placements of the APs that ensures that the wireless terminal multiplicities of all the wireless terminals becomes not less than two and minimizes the total cost. By virtue of this, it is made possible to from a wireless multi-hop network having the redundancy to the effect that, in spite of one wireless terminal having broken down, the remaining wireless terminals can normally perform communications.

It should be noted that the method of calculation of the covering range ensuring that the wireless terminal multiplicities of the respective wireless terminals become not less than two is not limited to the above-described one and other approximate methods may be relied on.

(Fifth Embodiment)

Next, a case where the possibility of communication is expressed by the probability of success is described with reference to FIG. 17. It should be noted that the probability of success between a pair of nodes can be calculated, as described above, on basis of the distance between the nodes and the actual communication data. In this embodiment, the optimization device optimizes the placements of the APs such that an expected value of the cost is minimized. In the following, the steps S2 and S3 in this embodiment are described.

According to this embodiment, in the step S2, the coverage range calculator 4 calculates a probability of coverage $G_{mn}$ as the covering range. The probability of coverage $G_{mn}$ is a probability of success of the communication between the candidate $AP_m$ and the "wireless terminal n." The coverage range calculator 4 may calculate the probability of coverage $G_{mn}$ on basis of the distance between the candidate $AP_m$ and the wireless terminal n. Also, the coverage range calculator 4 may calculate the probability of coverage $G_{mn}$ on basis of the probability of success between nodes which is calculated in advance. The probability of coverage $G_{mn}$ can be calculated, for example, by the following expression.

[Math. 7]

$$G_{mn} = 1 - \prod_{p \in PATH(m,n,K)} (1 - Prob(p)) \quad (74)$$

The variables that appear in the above expression(74) are defined as follows.

PATH(m, n, K) is a set of transmission paths through which the "wireless terminal n" is allowed to reach the candidate $AP_m$ within the "K" hops.

Prob(p) is the probability of success of communication from the "wireless terminal n" via the "path p" to the candidate $AP_m$. It is calculated by the product of the probabilities of success between the nodes on the path p.

FIG. 17 is a diagram that illustrates an example of a probability of coverage $G_{mn}$ calculated by the coverage range calculator 4. Referring to FIG. 17, for example, the probability of coverage G2a is 5%. The coverage range calculator 4 calculates, as illustrated in FIG. 17, the probabilities of coverage between the respective candidate APs and the respective wireless terminals. It should be noted that the method of calculation of the probability of coverage $G_{mn}$ is not limited to the above described on and other methods may be relied on.

In this embodiment, the optimization device optimizes the placements of the APs such that the expected value of the cost is minimized on basis of the probability of coverage.

In this embodiment, in the step S3, the optimization device should solve the following optimization problem.

[Math. 8]

$$\min \Sigma_{m \in \mathcal{M}} C_m \chi_m + \Sigma_{n \in \mathcal{N}} D_n y_n \quad (75)$$

$$\text{s.t. } \Pi_{m \in \mathcal{M}} (1 - G_{mn}) \chi_m = y_n, \forall n \in \mathcal{N}, \quad (76)$$

$$\chi_m \in \{0,1\}, 0 \leq y_n \leq 1, \forall m \in \mathcal{M}, \forall n \in \mathcal{N}. \quad (77)$$

The variables that appear in the above expressions (75) to (77) are defined as follows.

"$Y_n$" is the probability of the "wireless terminal n" not being covered by any one of the candidate APs.

The expression (75) is an objective function of the optimization problem, which is in line with the expression (21) of the second embodiment. Meanwhile, since the "$y_n$" is a probability, $D_n y_n$ will be an expected value of the cost regarding the "wireless terminal n" in a case where the "wireless terminal n" is not covered by any one of the candidate APs. The probability $y_n$ is calculated by the expression (76).

According to such an optimization method, it is made possible to select the combination of the placements of the APs that minimizes the expected value of the total cost on basis of the probability of success of communication between the nodes.

As has been discussed in the foregoing, according to the optimization device and method in accordance with this embodiment, it is made possible to select a combination of placements of the APs that satisfies a predetermined redundancy condition and minimizes the cost. Accordingly, it is made possible to form a low-cost wireless multi-hop network. Also, a highly reliable wireless multi-hop network can be formed by specifying the redundancy conditions such as the AP multiplicity and the wireless terminal multiplicity.

Further, it is made possible to take countermeasures to the uncertainty of the placements of the wireless terminals by modifying the redundancy condition, the number of allowable hops, and the like, or using the probability of success as the possibility of communication.

The present invention is not limited to the above described embodiments as they are, and constituent elements can be substantiated with deformation within a range not deviating from the gist thereof in a practical phase. Various inventions can be formed by appropriate combinations of the plurality of constituent elements disclosed in the above described embodiments. For example, some constituent elements can be deleted from all the constituent elements shown in the embodiments, and the elements across the different embodiments can be appropriately combined.

The invention claimed is:

1. An access point placement optimization device comprising:
    a memory configured to store:
        terminal information including locations of a plurality of wireless terminals in a wireless multi-hop network,
        access point information including locations of a plurality of access points which are tentatively placed in the wireless multi-hop network, and
        cost information of the access points and the wireless terminals, and processing circuitry configured to:
        determine possibilities of communication between respective pairs of nodes in the wireless multi-hop network, the nodes corresponding to the plurality of wireless terminals and the plurality of access points;
        calculate, on basis of the possibilities of communication, ranges of the wireless terminals covered by the plurality of access points to make communications within a predetermined number of hops;
        generate one or more combinations of the access points by combining the access points;
        calculate a cost and a redundancy for each of the one or more combinations, in case of placing access points included in the combination in the wireless multi-hop network and not placing an access point other than the access points included in the combination in the wireless multi-hop network, on basis of the ranges of the wireless terminals and the cost information; and
        select one combination from the one or more combinations on basis of the redundancy and the cost, the selected combination indicating access points to be placed in the multi-hop network.

2. The device according to claim 1, wherein the cost information comprises at least one of an access point placement cost, an access point communication cost, an isolation cost, and a non-redundancy cost.

3. The device according to claim 1, wherein the redundancy comprises at least either one or both of an access point multiplicity and a wireless terminal multiplicity.

4. The device according to claim 1, wherein a redundancy condition comprises access point multiplicities of the respective wireless terminals being equal to or larger than two or wireless terminal multiplicities of the respective wireless terminals being equal to or larger than two, and the processing circuitry selects the combination based on the redundancy condition.

5. The device according to claim 1, wherein the possibility of communication is represented by availability of communication or a probability of success of communication.

6. The device according to claim 1, wherein the possibility of communication is determined based on a distance or a terrain between the pair of nodes or based on actual communication data between the pair of the wireless terminals.

7. The device according to claim 1, wherein the number of hops is specified for each access point.

8. The device according to claim 1, wherein the number of hops is equal to or larger than two.

9. The device according to claim 1, further comprising an output device configured to output at least either one or both of the range calculated and the combination selected.

10. An access point placement optimization method comprising:
    providing terminal information including locations of a plurality of wireless terminals in a wireless multi-hop network and access point information including locations of a plurality of access point which are tentatively placed in the wireless multi-hop network;
    providing cost information of the access points and the wireless terminals;
    determining possibilities of communication between respective pairs of nodes in the wireless multi-hop network, the nodes corresponding to the plurality of wireless terminals and the plurality of access points;
    calculating, on basis of the possibilities of communication, ranges of the wireless terminals covered by the plurality of access points to make communications within a predetermined number of hops;
    generating one or more combinations of the access points by combining the access points;
    calculating a cost and a redundancy for each of the one or more combinations, in case of placing access points included in the combination in the wireless multi-hop network and not placing an access point other than the access points included the combination in the wireless multi-hop network, on basis of the ranges of the wireless terminals and the cost information; and
    selecting one combination from the one or more combinations on basis of the redundancy and the cost, the selected combination indicating access points to be placed in the multi-hop network.

11. A non-transitory computer readable medium having a computer program stored therein which, when executed by a computer, causes the computer to perform processing comprising:
    providing terminal information including locations of a plurality of wireless terminals in a wireless multi-hop network and access point information including locations of a plurality of access point which are tentatively placed in the wireless multi-hop network;
    providing cost information of the access points and the wireless terminals;
    determining possibilities of communication between respective pairs of nodes in the wireless multi-hop network, the nodes corresponding to the plurality of wireless terminals and the plurality of access points;
    calculating, on basis of the possibilities of communication, ranges of the wireless terminals covered by the plurality of access points to make communications within a predetermined number of hops;
    generating one or more combinations of the access points by combining the access points;
    calculating a cost and a redundancy for each of the one or more combinations, in case of placing access points included in the combination in the wireless multi-hop network and not placing an access point other than the access points included the combination in the wireless multi-hop network, on basis of the ranges of the wireless terminals and the cost information; and selecting one combination from the one or more combinations on basis of the redundancy and the cost, the selected combination indicating access points to be placed in the multi-hop network.

\* \* \* \* \*